Sept. 10, 1963  J. S. GARY  3,103,069
VACUUMIZED SURGICAL CAST CUTTER
Filed Nov. 14, 1962
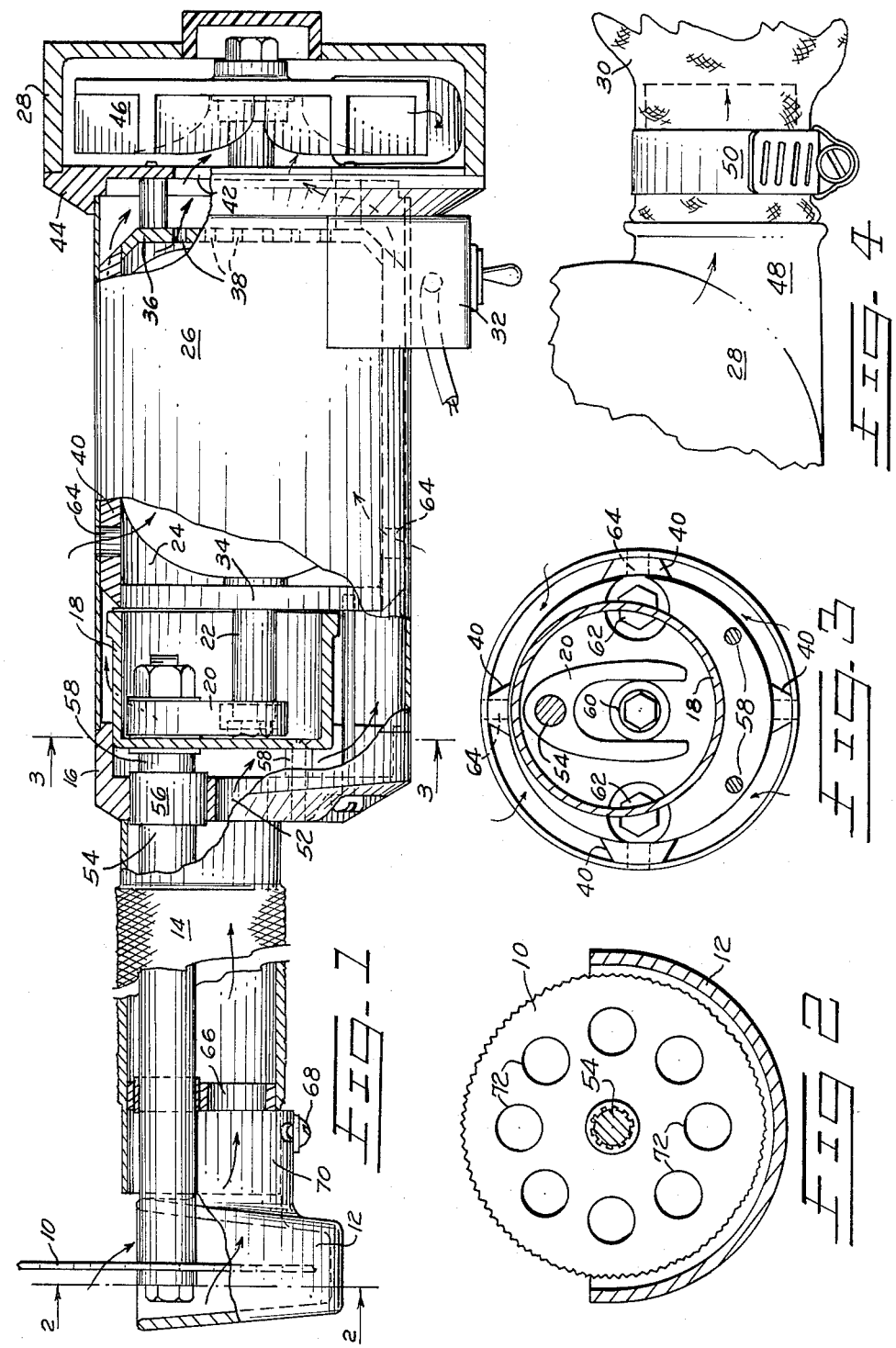

United States Patent Office

3,103,069
Patented Sept. 10, 1963

3,103,069
VACUUMIZED SURGICAL CAST CUTTER
James S. Gary, Claremont, Calif., assignor to Orthopedic Equipment Company, Bourbon, Ind., a corporation of Illinois
Filed Nov. 14, 1962, Ser. No. 237,607
5 Claims. (Cl. 30—124)

This invention pertains to power driven surgical or orthopedic cast cutters used for the cutting and removal of orthopedic casts of plaster or other hardened materials. In particular, the invention aims to provide such a cast cutter with a built-in and highly efficient air flow or vacuum collector for the dust and particles generated by the cutting operation.

It has been proposed in the prior art to combine a surgical cast cutter with a hose-type vacuum cleaner such as an ordinary domestic cleaner type, with its hose inlet positioned near the cutting saw. This combination has numerous faults, including the fact that the vacuum auxiliary is heavy, bulky and inconvenient to use, does not remove dust from the cutting site with the desired thoroughness, and is subject to other objections.

It is the principal object of the present invention to provide a portable power operated cast cutting saw with an integral or built-in vacuum attachment that will overcome the disadvantages of previous arrangements. In particular, the new combination is only slightly larger and heavier than known power operated cast cutters, allowing the surgeon complete ease and freedom to perform the necessary cutting. A subsidiary object is to design the combination so that the air flow which entrains the plaster dust passes directly from the cutting region, along the power motor shaft axis and ultimately to a collection bag or receptacle adjacent the motor end of the tool. This avoids all bulky and restrictive hoses, and enable the air flow to pass about the electric motor housing, contributing to increased cooling thereof for longer life and more comfortable handling.

Another object is to provide an appliance of this type in which the air impeller that produces the vacuum effect also operates to reduce the pressure inside the motor housing, so that fresh atmospheric cooling air, uncontaminated by plaster dust, can also be drawn into the internal motor housing from outside the appliance, thence directly over the motor windings and related parts, and through the impeller outlet.

A further object is to utilize the saw guard or shroud of the oscillating saw blade as an air flow guide to collect dust and direct it to the ultimate receptacle along the axis of the cutter, and to modify the saw blade itself to permit dust collection from both sides of the saw cutting plane for maximum dust collection efficiency.

The above and other advantages are obtained by an arrangement in which the air flow fan is located at the rear end of the cutter motor for direct driving connection with the saw motor shaft, and for direct air and dust discharge into a small cloth-filter bag or like receptacle fastened to the fan outlet. The air flow from the cutting saw region, or its guard or shroud, is along the axis of the cutter drive shaft, and thence about the motor wall and between that wall and the outside wall of the appliance. The auxiliary air flow is induced via small lateral holes through the outer casing and also through the motor housing, and thence through holes in the rear motor end plate to the main air stream through the impeller. The oscillating saw blade itself is perforated so that dust from both sides of its cutting plane is readily picked up and conveyed to the main air channel and receptacle.

A preferred construction of the new cast cutter is illustrated, by way of example, in the accompanying drawings, in which:

FIG. 1 is a side elevation, partly broken away, of the complete appliance.
FIG. 2 is a sectional view on line 2—2 of FIG. 1.
FIG. 3 is a sectional view on line 3—3 of FIG. 1.
FIG. 4 is a detail of the connection from the impeller housing to the filter bag.

The preferred embodiment of the cast cutter in accordance with the invention is illustrated in the drawings as comprising an assembly of certain major parts which will first be listed for a clear understanding, after which details thereof will be described. Referring first to FIG. 1, the circular oscillating cutter saw blade is indicated at numeral 10, and its safety guard or shroud at 12. The shaft of the blade passes lengthwise through a combined handle grip and air conduit cylinder or sleeve 14, thence into a connecting cap or housing 16 and a subsidiary cup-like housing 18, wherein the shaft terminates in the oscillating drive fork 20. A roller-bearing cam eccentrically secured on the end of motor shaft 22 oscillates the fork and hence the saw blade. The motor housing itself is designated by numeral 24, while a sleeve 26 surrounds the motor housing and fits endwise between the cap 16 and the cover plate of an impeller housing 28. The discharge of the impeller (FIG. 4) is to a cloth bag or receptacle 30 which allows the air to pass through its interstices, retaining the plaster dust and other solids. An on-off power switch is indicated at 32.

Since the motor powers both the oscillating saw and the vacuum fan or impeller, and is in other respects basic to the assembly, its construction will now be described. Reverting to FIG. 1, the motor is contained in the metal housing 24 which is closed at the forward (left) end by a tight cover 34 through which the motor shaft 22 passes via a sealed bearing. The opposite end of the motor housing 24 is also closed, by a plate 36 which however is provided with a plurality of air passages or holes 38. The outer sleeve 26 is larger than the cylindrical diameter of the motor housing, but as will best be seen in FIG. 3, the motor housing has four angularly spaced fins or ribs 40 which locate the sleeve 26 so as to define four lengthwise air passages between the motor housing and sleeve. These passages communicate, at the left end of the motor housing, with the spaces between sleeve 26 and the cup-like housing 18, and at their right end the lengthwise passages discharge into the central aperture 42 of the end cap or cover plate 44 of the impeller housing 28. The impeller or fan 46 is of usual construction, and is directly mounted on the rear (right) extension of the motor shaft. The air discharge from the impeller is shown at the bottom of the impeller housing 28 in FIG. 1, and as better shown in FIG. 4 it is defined by the tangential nipple 48 to which is connected the open mouth of the bag or like receptacle 30, as by means of a conventional hose clamp 50. The bag may also be provided with a strap, not shown, through which the user may pass his arm for convenient support thereof.

From the foregoing, it will be clear that the rotation of the impeller 46 draws air around the outside of the motor case, and for the most part this main air flow enters the passage between fins 40 from the forward end of the cap or housing 16, which has an aperture 52 so that the air is drawn through the grip sleeve 14 (around shaft 54) from the shroud 12 and the saw or blade 10. Shaft 54 passes through the front wall of housing 16 via a bearing 56, and through another bearing in the wall of cup 18 which is supported in spaced relation from the inner wall of housing 16 by a small collar such as 58 and a retaining screw. The position of cup 18 is also defined by the bearing through which passes the rear end of shaft 54, and within the cup the shaft has rigidly secured thereto the oscillating fork or yoke 20 (see also FIG. 3 for these details) which embraces the eccentric roller bearing 60 on motor shaft 22. The heads of assembly screws or bolts 62 of the motor housing are visible in FIG. 3, as are the locations of the screws 58 above mentioned. The cup 18 is mainly provided so as to retain against leakage the greasy lubricant which is desirable for the yoke drive. A sealing gasket lies between the open face of cup 18 and the adjacent end face of motor housing end plate 34.

In addition to the main air flow described above, which picks up plaster dust from shroud 12 and later passes around motor housing 24 to cool the same (and sleeve 26), a portion of the total air flow is derived from the subsidiary paths within the motor housing, picking up heat from the motor windings and other internal structure. To this end, both sleeve 26 and the housing 24 are perforated or apertured by concentric sets of holes such as 64, preferably four in number, these being equally spaced about the periphery and in fact passing through the respective fins or ribs 40. The lengthwise location of the holes is such as to place them near the forward (left) end of the motor housing, and though them air enters from the relatively "clean" exterior atmosphere (away from the saw 10) and thence, by reason of the reduced pressure in the motor housing, through the end plate 36 at apertures 38.

Shaft 54, in passing through grip sleeve or cylinder 14, is supported near the saw blade end by a bearing in a plate 66 fitted in the sleeve, and also apertured by several holes so as not to interfere unduly with the air flow. The shroud 12 is secured to the end of sleeve 14 by a screw 68 passing through an arcuate slot in the half-cylindrical portion 70 of the shroud.

As best shown in FIG. 2, the saw blade 10 is secured to the reduced and splined end of shaft 54, and the blade is apertured as at the eight holes 72. Since the blade 10 oscillates, rather than enjoying pure rotation, for reasons of safety well recognized in this art, the presence of the holes 72 allows dust from the left side of the blade, away from the direct air stream into sleeve 14, to pass through such holes and to be picked up in the air stream for transport to the collection bag 30. Without the holes 72, it is found that the efficacy of the vacuum system is only about half what it ought to be for maximum utility.

While the invention has been described herein in considerable detail, so that those skilled in the art may practice the same, it will be understood that various changes can be made in the structure without departing from the true spirit and scope of the invention as defined in the appended claims.

What is claimed is:

1. A surgical cast cutter with built-in vacuum dust collection facilities, comprising:
    (a) an encased electric drive motor having a blade-oscillating motion transmission connected to one end of its power shaft,
    (b) an oscillating cutting saw blade secured to the output drive of said transmission,
    (c) a vacuum impeller connected to the other end of the motor power shaft,
    (d) an outer housing surrounding said encased motor and transmission and defining an air and dust conveying channel from said blade to said impeller, and
    (e) a dust collection receptacle connected to the output of said impeller.

2. A cast cutter in accordance with claim 1, including a saw blade guard partly surrounding said saw blade and communicating with the channel formed by said outer housing.

3. A cast cutter in accordance with claim 2, in which said saw blade is perforated to convey dust from both sides thereof directly into the air stream moving toward said impeller.

4. A surgical cast cutter with built-in vacuum dust collection facilities, comprising:
    (a) an encased rotary electric drive motor having a blade-driving motion transmission connected to one end of its power shaft,
    (b) a saw blade secured to the output drive of said transmission,
    (c) a vacuum impeller connected to the other end of the motor power shaft,
    (d) an outer housing surrounding said encased motor and transmission and defining an air and dust conveying channel from said blade to said impeller;
    (e) said outer housing and the casing of said motor being apertured to define an air ingress to said motor along a path separated from said channel, and
    (f) air egress openings in the motor casing at a point adjacent the air inlet of said impeller.

5. A surgical cast cutter with built-in vacuum dust collection facilities, comprising:
    (a) an electric drive motor having a generally sealed cylindrical casing and a tool drive connected to one end of its axial power shaft,
    (b) a cutting tool secured to the output end of said tool drive,
    (c) a vacuum impeller connected to the other end of the motor power shaft,
    (d) an outer housing surrounding and in part peripherally spaced from said encased motor to define an air and dust conveying channel from said tool to said impeller, and
    (e) means defining a cooling air ingress duct through the wall of said housing and the cylindrical wall of said motor casing;
    (f) the end wall of said motor casing being perforated to discharged motor cooling air from within said casing to the inlet of said impeller.

References Cited in the file of this patent

UNITED STATES PATENTS

| | | |
|---|---|---|
| 1,945,425 | Emmons | Jan. 30, 1934 |
| 2,330,952 | Christen et al. | Oct. 5, 1943 |
| 2,598,212 | Blair | May 27, 1952 |